US010298665B2

(12) United States Patent
Li

(10) Patent No.: US 10,298,665 B2
(45) Date of Patent: *May 21, 2019

(54) CLOUD FEDERATION AS A SERVICE

(71) Applicant: INTEL CORPORATION, Santa Clara, CA (US)

(72) Inventor: Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,071

(22) Filed: Jul. 19, 2017

(65) Prior Publication Data

US 2018/0013819 A1 Jan. 11, 2018

Related U.S. Application Data

(60) Continuation of application No. 14/584,744, filed on Dec. 29, 2014, now Pat. No. 9,749,398, which is a (Continued)

(51) Int. Cl.

*G06F 15/16* (2006.01)
*H04L 29/08* (2006.01)

(Continued)

(52) U.S. Cl.

CPC ............ *H04L 67/10* (2013.01); *G06F 9/5055* (2013.01); *G06F 15/16* (2013.01); *G06F 21/41* (2013.01);

(Continued)

(58) Field of Classification Search

CPC ..... H04L 63/0815; H04L 67/10; H04L 67/42; H04L 29/06; H04L 43/0811; G06F 21/41; G06F 17/30566

(Continued)

(56) References Cited

U.S. PATENT DOCUMENTS 6,122,740 A * 9/2000 Andersen ................ G06F 21/41 726/4
7,230,926 B2 * 6/2007 Sutherland .......... H04L 41/0677 370/241

(Continued)

FOREIGN PATENT DOCUMENTS

CN 1599910 3/2005
CN 101523365 9/2009

(Continued)

OTHER PUBLICATIONS

Office Action for European Patent Application No. 10 252 084.8-1243 dated Jun. 14, 2012, 4 pgs.

(Continued)

*Primary Examiner* — Dustin Nguyen
*Assistant Examiner* — Hao H Nguyen
(74) *Attorney, Agent, or Firm* — Christopher K. Gagne

(57) ABSTRACT

A Cloud federator may be used to allow seamless and transparent access by a Cloud Client to Cloud services. Federation may be provided on various terms, including as a subscription based real-time online service to Cloud Clients. The Cloud federator may automatically and transparently effect communication between the Cloud Client and Clouds and desired services of the Clouds, and automatically perform identity federation. A Service Abstraction Layer (SAL) may be implemented to simplify Client communication, and Clouds/Cloud services may elect to support the SAL to facilitate federation of their services.

24 Claims, 5 Drawing Sheets

Related U.S. Application Data division of application No. 12/653,701, filed on Dec. 17, 2009, now Pat. No. 8,924,569.

(51) Int. Cl.
*G06F 9/50* (2006.01)
*G06F 21/41* (2013.01)
*H04L 29/06* (2006.01)

(52) U.S. Cl.
CPC ........ *H04L 63/0815* (2013.01); *H04L 63/102* (2013.01); *H04L 67/42* (2013.01); *H04L 67/327* (2013.01)

(58) Field of Classification Search
USPC ....... 709/203, 224, 225, 226, 228, 229, 231; 726/3, 4, 8, 15
See application file for complete search history.

(56) References Cited

U.S. PATENT DOCUMENTS

| | | | |
|---|---|---|---|
| 8,924,569 B2 | 12/2014 | Li | |
| 9,749,398 B2 | 8/2017 | Li | |
| 2001/0000045 A1 | 3/2001 | Yu et al. | |
| 2002/0059425 A1* | 5/2002 | Belfiore | G06F 9/54 709/226 |
| 2003/0051021 A1 | 3/2003 | Hirschfeld et al. | |
| 2003/0149781 A1* | 8/2003 | Yared | G06F 21/41 709/229 |
| 2003/0177215 A1* | 9/2003 | Sutherland | H04L 12/413 709/223 |
| 2003/0233329 A1* | 12/2003 | Laraki | G06Q 20/123 705/52 |
| 2006/0218630 A1 | 9/2006 | Pearson et al. | |
| 2008/0021997 A1* | 1/2008 | Hinton | H04L 63/0815 709/225 |
| 2009/0037391 A1* | 2/2009 | Agrawal | G06F 17/30566 |
| 2009/0249439 A1* | 10/2009 | Olden | H04L 63/0815 726/1 |
| 2010/0010944 A1 | 1/2010 | Cheng et al. | |
| 2010/0027552 A1 | 2/2010 | Hill | |
| 2010/0235903 A1 | 9/2010 | Carter et al. | |
| 2011/0010944 A1 | 1/2011 | Le Dissez et al. | |
| 2011/0107398 A1 | 5/2011 | Earl et al. | |
| 2011/0107411 A1 | 5/2011 | McClain et al. | |
| 2011/0138049 A1* | 6/2011 | Dawson | G06F 9/451 709/226 |
| 2011/0145413 A1 | 6/2011 | Dawson et al. | |
| 2011/0182291 A1 | 7/2011 | Li et al. | |
| 2012/0096149 A1 | 4/2012 | Sunkara et al. | |

FOREIGN PATENT DOCUMENTS

| | | |
|---|---|---|
| CN | 101557551 | 10/2009 |
| JP | 2004-531780 | 10/2004 |
| JP | 2004531780 | 10/2004 |
| WO | WO-01/72009 | 9/2001 |
| WO | WO-2001/098936 | 12/2001 |

OTHER PUBLICATIONS

Notice of Preliminary Rejection for Korean Patent Application No. 10-2010-129481 dated Jun. 4, 2012, 2 pgs.
1st Office Action, Chinese Application No. 2010106132122.X, (dated Apr. 8, 2013), 7 pages.
2nd Office Action, Chinese Application No. 2010106132122.X, (dated Jan. 2, 2014), 12 pages.
3rd Office Action, Chinese Application No. 2010106132122.X, (dated Apr. 10, 2014), 12 pages.
4th Office Action, Chinese Application No. 2010106132122.X, (dated Nov. 2, 2014), 8 pages.
English Translation of Japan Office Action, Japan App. No. 2010-276064 dated (Jul. 31, 2012), 4 pages.
European Search Report, EP 10252084.8-1243/2336886, dated May 7, 2012, 7 pages.
Search Report, Chinese Application No. 2010106132122.X, dated Mar. 28, 2013, 2 pages.
Office Action for U.S. Appl. No. 14/584,744, dated Sep. 26, 2016.
Office Action for U.S. Appl. No. 12/653,701, dated Apr. 30, 2012.
Office Action for U.S. Appl. No. 12/653,701, dated Oct. 9, 2012.
Notice of Allowance dated May 5, 2017 in U.S. Appl. No. 14/584,744, and related attachments.
Office Action dated Sep. 26, 2016 in U.S. Appl. No. 14/584,744, and related attachments.
Notice of Allowance dated Aug. 14, 2014 in U.S. Appl. No. 12/653,701, and related attachments.
Office Action dated Dec. 17, 2012 in U.S. Appl. No. 12/653,701, and related attachments.
Office Action dated Oct. 9, 2012 in U.S. Appl. No. 12/653,701, and related attachments.
Office Action dated Apr. 30, 2012 in U.S. Appl. No. 12/653,701, and related attachments.
Office Action dated Feb. 2, 2012 in U.S. Appl. No. 12/653,701, and related attachments.
Office Action dated Dec. 28, 2011 in U.S. Appl. No. 12/653,701, and related attachments.
Office Action dated Jun. 28, 2018 in Chinese Patent Application No. 201510493466.4, related attachments, and organized partial summarized English translation thereof.
Partial summarized English translation of Office Action dated Oct. 10, 2017 (and associated search report) in Chinese Patent Application No. 201510493466.4.
Notification to grant patent right dated May 28, 2015 in Chinese Patent Application No. 201010613122.X, and organized partial summarized English translation thereof.
Supplementary Search dated Feb. 3, 2015 in Chinese Patent Application No. 201010613122.X.
Supplementary Search dated Dec. 24, 2013 in Chinese Patent Application No. 201010613122.X.
Extended European Search Report dated Jan. 25, 2018 in European Patent Application No. 17201157.9, and related attachments.
Acknowledgement of withdrawal of European Application dated Jan. 29, 2018 in European Patent Application No. 10252084.8.
Summons to oral proceeding dated Apr. 19, 2017 in European Patent Application No. 10252084.8.
Office Action dated May 28, 2015 in European Patent Application No. 10252084.8.
Decision on Registration dated Nov. 2, 2012 in Korean Patent Application No. 10-2010-0129481, and partial summarized organized English translation thereof.
Decision of Refusal dated Jan. 8, 2013 in Japanese Patent Application No. 2010-276064, and partial summarized organized English translation thereof.
Notification To Grant Patent Right For Invention and Notification To Go Through Formalities of Registration dated Feb. 18, 2019 in Chinese Patent Application No. 201510493466.4, and summarized partial English translation thereof.

* cited by examiner

CLOUD FEDERATION AS A SERVICE

CLAIM OF PRIORITY

This application is a continuation of U.S. patent application Ser. No. 14/584,744, filed Dec. 29, 2014, which is a divisional application of U.S. Pat. No. 8,924,569, entitled "Cloud Federation as a Service", by Hong Li, et al., filed Dec. 17, 2009, the benefit of and priority to which are claimed thereof, and the entire contents of which are incorporated herein by reference.

FIELD OF THE INVENTION

The present invention generally relates to cloud services and virtualization, and more particularly to providing a federated cloud service environment transparently making interoperable multiple incompatible cloud services.

BACKGROUND

The phrase "cloud computing" is one of many references to the concept of seeking to provide a diverse set of Internet based "services" to a broad variety of clients. Often the term "cloud" is used to refer to accessing resources on the Internet; cloud computing generally refers to an abstraction of resources and the network infrastructure needed to access resources of the cloud. Cloud computing is an "on-demand" environment including characteristics previously associated with many utility and grid computing models. Cloud computing generally tries to harness ever increasing computing power and sophistication in computing technologies. The terms "service" or "services" are used to refer to such abstracted resources. Various services, such as ones provided by Amazon.Com, Inc. (e.g., Simple Storage Service (S3)), Google Inc. (e.g., Google File System (GFS)), or Microsoft Corporation (e.g., Microsoft Office Online) represent well known cloud computing resources typically accessed from a web browser or other light weight client through the cloud. Unlike a traditional application program, where the application and its data are typically stored on a local storage, with cloud services, this information is typically stored on remote (corporate) servers. Generally speaking, cloud computing encompasses any subscription based or hosted service accessible over the Internet.

Cloud applications are generally broadly divided into categories, such as:

(1) Web Services, e.g., software designed to be interoperable machine-to-machine using a well defined software interface such as Web Services Description Language (WSDL), Application Programming Interface (API), or other standardized communication protocol;

(2) Software as a Service (SaaS), which is essentially just delivery/on demand utilization of application software, e.g., an email application program simultaneously accessed through a browser by thousands of customers;

(3) Infrastructure-as-a-Service (IaaS), in which clients are provided with virtual servers and/or on-demand resources, such as storage, that are paid for as needed akin to consuming a utility resource; and (4) Platform as a Service (PaaS), for allowing developers to deploy applications hosted on cloud-based infrastructure.

In cloud computing, a client device, software, etc. often needs to connect to different clouds to receive different services. Unfortunately, each cloud provider does not own the user's business and there is no standardized or seamless inter-connection among services to which a user or client may subscribe.

BRIEF DESCRIPTION OF THE DRAWINGS

The features and advantages of the present invention will become apparent from the following detailed description of the present invention in which.

DETAILED DESCRIPTION

Figure 1:
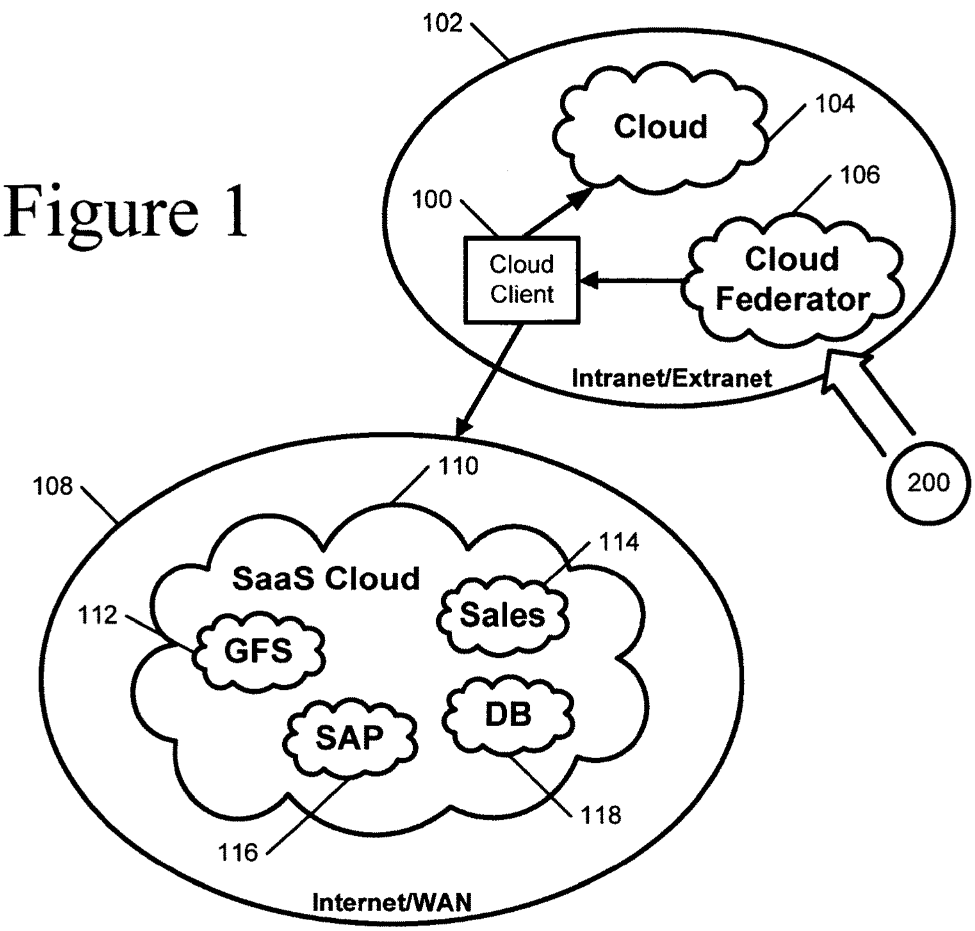
FIG. 1 illustrates, according to one embodiment, a Cloud Client located within a first network seeking access to multiple Clouds including one on a second network.

A drawback to current cloud service options is there is no "one stop shopping" for transparently utilizing multiple offerings from multiple service providers. Currently each service provider has a proprietary environment providing cloud services, and hence proprietary account management, proprietary data formats, etc. To make cloud computing more useful, users/clients/servers need to be able to know how to seamlessly switch between different clouds to access different services and functions from different clouds simultaneously. However, due to lack of inter-connection, there is no automatic migration/interoperability between different cloud service providers. For example, a user/client would need to use and therefore reconfigure different accounts, user interfaces, applications, network connections, payment strategies, etc., to move between clouds/services. Moreover, capabilities do not exist to allow users/clients who subscribe to different clouds/services to interact beyond simplistic email exchanges.

To address this, and other cloud computing seamless interoperability issues, selected embodiments concern providing a federated customer profile across multiple cloud services, cloud vendors, data environments, Information Technology systems, etc. (collectively referred hereafter simply as Clouds) to allow various Cloud Clients to seamlessly access different Clouds for different services. The phrase Cloud Client is intended to generally and collectively include software and/or devices, server software and/or devices, middleware, and/or logical, virtual constructs, Artificial Intelligence or rules-based programming constructs, as well as a user thereof that is capable of accessing Cloud services.

As indicated above, what is missing from a typical cloud configuration is a universal customer profile federation service that can provide real-time "brokerage" for connections and provide interoperability so a Cloud Client can connect to any Cloud service without additional user configuration. In one embodiment this will enable a Cloud Client to seamlessly and securely use and move between different Clouds simultaneously without changing or accessing profiles. Exemplary multiple Cloud services include development collaboration across different cloud platforms, open gaming, cross referencing, component reuse, user transparent payment, and the like. Brokering connections for interoperability may borrow from telecommunication federation principles, e.g. the telecommunications industry developed standards for telephony interconnection, routing, billing, clearing, and revenue settlement.

It will be appreciated service federation includes not only passing identity information associated with a Cloud Client that may be applied across multiple Clouds, but a federated profile may also include storing multiple copies of identity customer profile with different Cloud providers, as well as storing portions of identity profile in parts across multiple Clouds. For example, a Cloud may desire to cache certain aspects of a Cloud Client's profile that may be particularly relevant to that Cloud and possibly difficult and/or expensive in terms of time and/or resources to obtain or reconstruct that data when a Cloud Client reconnects. It will be appreciated various communication techniques and technologies may be employed to federate Cloud Client profile, and that in various embodiments, a Cloud Client may have local controls, preferences, security or other policies that affect and/or direct the Cloud Client's profile federation (see, e.g., FIG. 2 item 216). In one embodiment, profile federation is implemented using open standards and/or protocols, such as those to support cross-domain single sign-on with entitlement management. For example OASIS SAML (Security Assertion Markup Language) specification, an XML (eXtensible Markup Language)-based standard for exchanging authentication, authorization data and other profile information may be used at least in part to implement profile federation.

Figure 6:
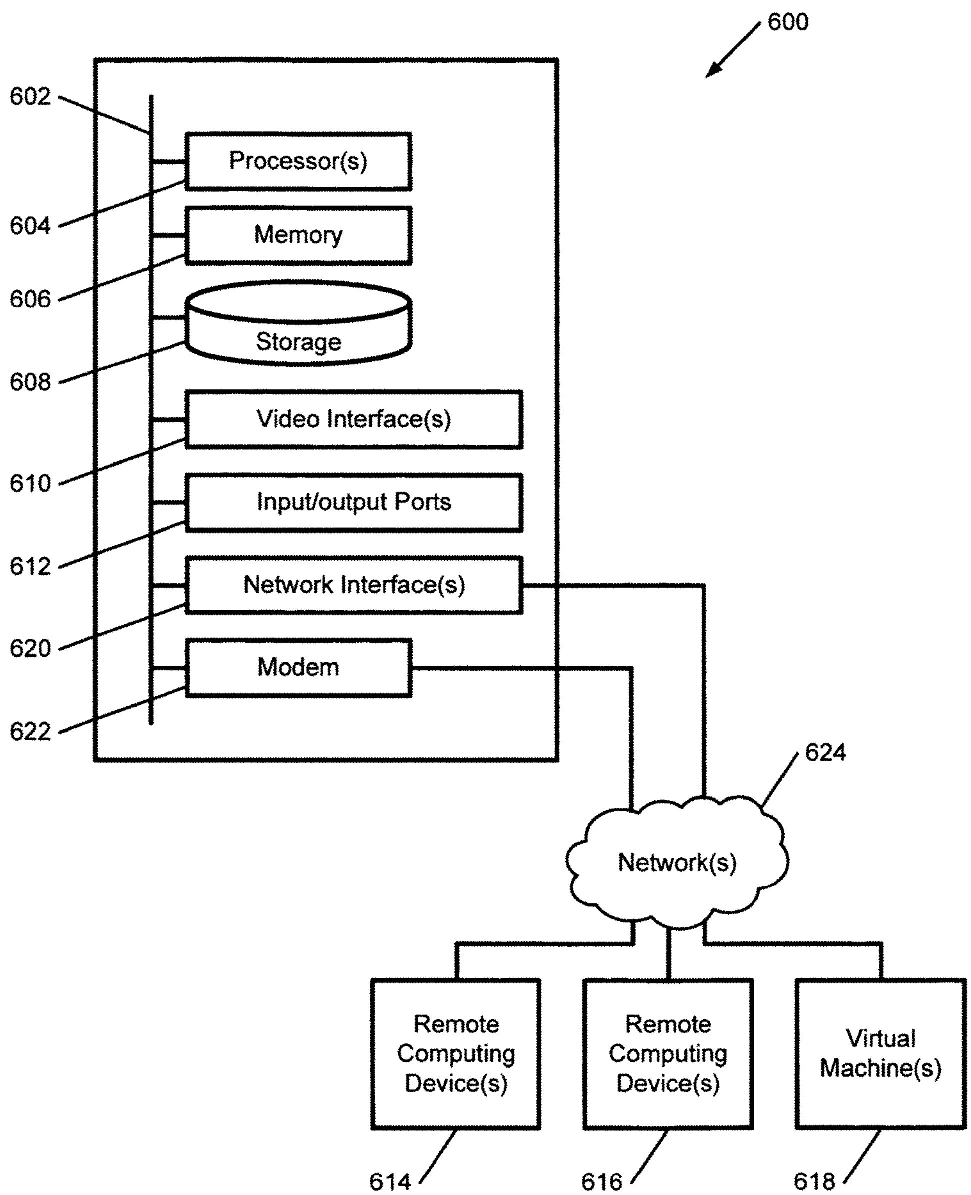
FIG. 6 illustrates a suitable computing environment in which certain aspects of the invention may be implemented.

In illustrated embodiments, reference may be directly or indirectly made to physical devices or resources, such as clients, servers, machines, virtual machines, routers/switches, mass storage, and other machines such as discussed with respect to FIG. 6. It will be appreciated by one skilled in the art, unless specifically called out to have one or more unique characteristic, they are expected to be generic and hence may be substituted one for another or between devices without materially changing inventive intent herein. In illustrated embodiments, reference may also be directly or indirectly made to logical devices, which one skilled in the art will appreciate generally corresponds to associating metadata with a physical device or resource to make it effectively unique from other physical devices or resources. The expression "effectively unique" is used because while a true globally unique identifier (GUID) of some sort may be used in the associated metadata, one may also use a locally unique or statistically likely to be unique identifier instead. An exemplary logical device is a network interface card (NIC) or other communication endpoint since to enable communication between endpoints, the generic physical device must be assigned metadata (e.g. a Media Access Control (MAC) address or other identification) to allow distinguishing between endpoints.

In addition to physical and logical devices, it will be appreciated virtual devices may be used to implement portions of embodiments of the invention. A virtual device may be thought of as a logical device that is not tied to an actual physical device, but instead operates with respect to arbitrarily defined virtual hardware. Virtual machine environments, for example, utilize virtual hardware abstracting actual underlying physical hardware in which the virtual machine may be operating. In one embodiment, a logical device or a virtual device may be physically separated from associated underlying physical hardware. For example, a logical device in one location may use a network to access physical hardware in a different location.

In one embodiment, a Cloud Client accesses what appears to be a single Cloud service, where the service in fact represents a transparent integration of multiple services in multiple Clouds, where one or more of the services are provided by incompatible vendors in the Cloud. In one embodiment, through use of a federated profile the Cloud Client will not need to reconfigure applications, services, accounts, etc. to access incompatible Clouds and services and instead the Cloud Client has automatic migration and interoperability. Note while reference may be made to a single service or single client, it will be appreciated in various embodiments multiple related and/or unrelated clients may access multiple related and/or unrelated services from multiple related and/or unrelated providers.

FIG. 1 illustrates, according to one embodiment, a Cloud Client 100 located on a first network 102 seeking access to multiple Clouds including a Saas (Software as a Service) Cloud 110 located on a second network. The first network 102 as illustrated is a private network such as an intranet or extranet, but it will be appreciated it may be any type of network. The second network 108 as illustrated is the Internet or Wide Area Network (WAN), however, as with the first network 102, it will be appreciated the second network 108 network may be of any type. In the illustrated embodiment, the Cloud Client seeks access to multiple Clouds, including first network Cloud 104 as well as one or more services 112-118 of the remote SaaS Cloud 110.

In the illustrated embodiment, Cloud 104 may provide any manner of Cloud service or services, such as providing data center services and/or computational resources to entities within (e.g., communicatively coupled with) the first network 102. In the illustrated embodiment the Cloud Client accesses cloud services from Cloud 104, such as to access a virtualized datacenter. Additionally, the Cloud Client also seeks to access services of the remote SaaS Cloud 110 on the second network 108 for business functions. In the illustrated embodiment, the local and remote Clouds 104, 110 may use incompatible and/or proprietary techniques for authenticating and/or communicating access needs and data transport between the Clouds 104, 110 and the Cloud Client 100; however, in the illustrated embodiment, accessing the local and remote Clouds 104, 110 is transparent to the Cloud Client 100.

To facilitate this transparent access to services, the Cloud Client 100 subscribes to a Cloud Federator 106 located within the local network 102. While the Cloud Federator is illustrated as being within the first network 102 it will be appreciated it may instead be located on the second network 108 or another network (not illustrated) so long as it is communicatively coupled with the Cloud Client 100 and any other Clouds with which the Cloud Client seeks services. It will be appreciated use of the Cloud Federator 106 may be on any desired terms, e.g., use may be on free access terms (e.g., as a public service or government subsidy), as a pay per use service (not illustrated is an appropriate transaction tracking/charging service), as part of a technology access agreement or license agreement (e.g., a corporate or university site license), etc. It will be further appreciated that access may be granular and that individual services or sub-services thereof may have different access terms.

In the illustrated embodiment, the Cloud Federator inside the first network 102 provides a real-time integration between Cloud 104 and the SaaS Cloud 110. The integration services provided by Cloud 104 can include a variety of services such as modifying data to be transported between Cloud Client 100 and Cloud services so as to ensure a consistent user interface. It will be appreciated that the Cloud Federator may have predetermined mappings to make various Cloud communication consistent, however the Cloud Federator may contain a hardware and/or software component, or access an external resource (not illustrated), to allow the Cloud Federator to dynamically classify and/or modify data for consistent presentation to the Cloud Client.

For example, to present billing data, while many Cloud service may use a common interface for marking the billing data, e.g., by way of a tag based description language such as XML, which may make it simpler to consistently present billing data, some Cloud services may use atypical descriptions or formats and it will be appreciated that a classification component of the Cloud Federator may be used to dynamically analyze the atypical description and conclude it is billing data and present it accordingly. Proper identification of billing data also allows for seamless and automatic payment for services when such payments are authorized, and thus removes any need for a user of the Cloud Client to manually configure payment settings or manually process payments.

In one embodiment, Cloud Federator 106 implements a Service Abstraction Layer (SAL) that defines a standardized service interface to which is mapped (as needed) service requirements and techniques for different Clouds, with translations as needed for compatibility between various Clouds and the SAL. As will be discussed with respect to FIG. 2 below, various data 200 may be used to assist with this mapping.

It will be appreciated the Cloud Federator 106 may itself operate as a Cloud service providing at least seamless and transparent connections between the Cloud Client 100 and various Clouds regardless of access incompatibilities. It will be appreciated the Cloud Client may provide the Cloud Federator with identities of Clouds to which it seeks to subscribe, however in one embodiment, the Cloud Client identifies a type of services or data to which it seeks to subscribe, and the Cloud Federator locates an appropriate Cloud providing the desired services or data. It will be appreciated in this embodiment the Cloud Federator may apply heuristics (see, e.g., FIG. 2 AI/Expert System 204) to select a Cloud meeting desired constraints (see, e.g., FIG. 2 Policies 216), such as cost, speed, high availability (e.g., connectivity reliability), etc.

Figure 2:
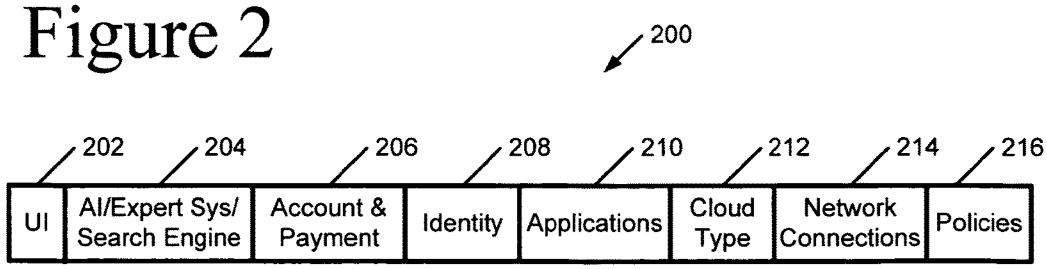
FIG. 2 illustrates according to one embodiment some exemplary data and/or Cloud interfaces a Cloud Federator may automatically and transparently manage for a Cloud Client.
Figure 3:
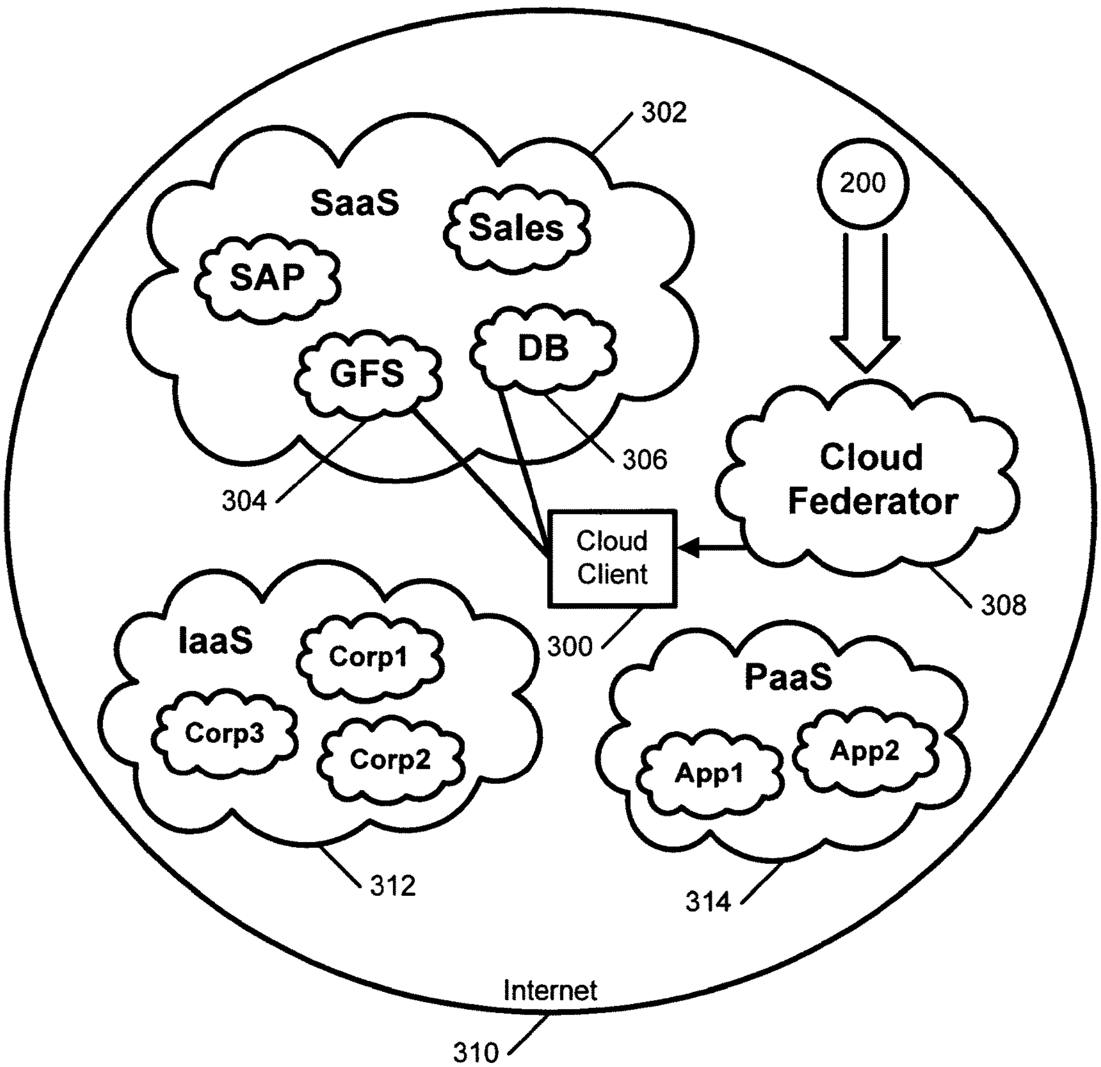
FIG. 3 illustrates a use case, according to one embodiment, in which a Cloud Client wants to connect to different SaaS Cloud services.
Figure 4:
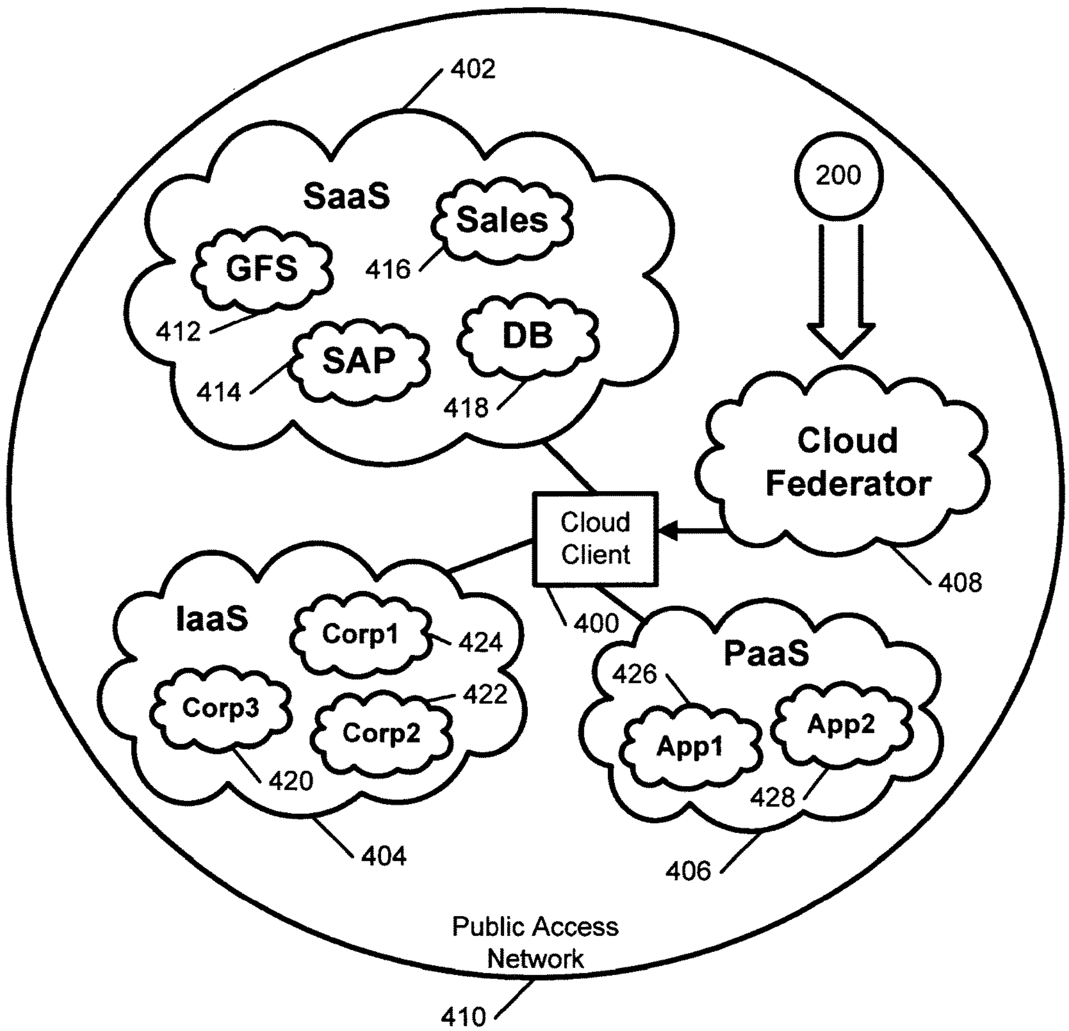
FIG. 4 illustrates a use case, according to one embodiment, in which a Cloud Client wants to connect to different types of Clouds.

FIG. 2 illustrates according to one embodiment some exemplary data and/or Cloud related interfaces 200 an Cloud Federator, such as the FIGS. 1, 3, 4 Cloud Federator 106, 302, 402, may use to automatically and transparently manage Cloud Client access to Cloud services. It will be appreciated the illustrated data may be a database record, or data file, component, etc. stored within some type of storage (not illustrated, see, e.g., FIG. 6).

As illustrated there may be a User Interface (UI) component defining the type of information and/or formatting a Cloud Client may be expecting to receive. As discussed above with respect to FIG. 1, interaction between the Cloud Client and various Clouds is seamless and transparent, and towards that end a common UI may be adopted by the Cloud Client. It will be appreciated that well known Cloud services may provide their service with a well-defined interface and/or provide an API (Application Program Interface) or descriptive language to allow a Cloud Client to present different Cloud UI's in a common format as desired by the Cloud Client. In one embodiment, UI 202 describes the desired UI format to be used for the Cloud Client. It will be appreciated that different Cloud Clients may adopt different UI formats.

Also illustrated is data that may be used by an Artificial Intelligence (AI)/Expert System/Search Engine 204 (hereafter AES). It will be appreciated by one skilled in the art that if a particular Cloud service does not utilize a well-defined format for accessing its service, then it may be somewhat more difficult to present a seamless and transparent access to that particular Cloud's services. In one embodiment, a Cloud Client applies AES data so that an AES may operate as a middle-man between the Cloud Client and the particular Cloud. In one embodiment the AES analyzes data and identifies material for presenting to the Cloud Client. For example, to provide a common UI 202 with a new Cloud, or as discussed above with respect to FIG. 1 for identifying and utilizing Account and Payment information 206. It will be appreciated that depending on how the AES is implemented, the entire AES itself may be represented here, such as by way of defining it with a rule set stored within data 204. It will be appreciated a Cloud Federator may assist a Cloud Client to identify cloud services based at least in part on customer requirements and the AES.

It will be appreciated Cloud Clients may store Account and Payment information 206 for services for which a Cloud Client is already configured to pay. It will be appreciated a Cloud Client may have constraints such as relating to maximum amount, frequency, contract terms, or other constraints or criteria. Account and Payment information may also include various payment methods, e.g., bank accounts, credit cards, payment services such as PayPal, as well as restrictions or preferences in the use of the payment methods in various contexts. Account and Payment information may also be configured in various embodiments to indicate certain kinds of payments or services, such as adult services, that are simply prohibited. And, as with the UI 202, it will be appreciated that Account and Payment information may be accessed with respect to the AI/Expert System 204 to allow for dynamically analyzing and processing payments with Clouds not using a well known format or interface to their payment system. For brevity herein the AI/Expert system 204 will not be called out for how it may be applied with the remaining exemplary data or Cloud related interfaces 208-216, but one skilled in the art will appreciate it may be used.

Also illustrated is Identity information 208. In one embodiment, the Identity information contains typical identifying information about the Cloud Client, such as device name, device address, tokens for associating payment options (which would be reflected in the Account and Payment information), etc.; however the identifying information may also it may also, or instead, contains identifying information for a user of the Cloud Client, such as the user's name(s), address(es), numeric identifier(s) such as driver's license number, social security number, etc., as well as payment choices (which would be reflected in the Account and Payment information). It will be appreciated that some or all of the Identity information will be used as needed to authenticate a Cloud Client with a particular Cloud or service(s) thereof.

Also illustrated is Applications information 210 which may contain information to facilitate automatic integration between different Clouds and their services. Applications information may include services for which a Cloud Client wants to access, services that should be avoided, services that should generate a prompt to a user (if the Cloud Client is configured to interact with a user, e.g., some Cloud Clients may be autonomous and/or embedded without a user interface) for confirmation before accessing. Applications information may also contain information required for seamless and transparent access to a Cloud. For example, as illustrated in FIG. 1, Clouds 104, 110 may have completely different techniques for authentication with the Clouds. Applications information 210 may be used to store authentication requirements, techniques, security tokens, and other data, as well as utilize, for example, the Account and Payment 206 information, and the Identity 208 information, to access the Clouds 104, 110 notwithstanding their having different authentication requirements.

In the illustrated embodiment, there may also be a Cloud Type information. As discussed above the illustrated data 200 may be multiply instantiated such as records in a database, where a data set is tracked for each cloud for which seamless integration is desired. The Cloud Type may be used to track different types of the Clouds (e.g., SaaS, IaaS, PaaS, etc.) and the FIG. 1 Cloud Federator 106 being used by a Cloud Client. In one embodiment, the Cloud Federator provides multiple layers of federation, for example, allowing multiple Clouds to be independently authenticated with a Cloud Client with, and, if desired, with different levels of access to Cloud Client features by a Cloud service, and/or different levels of integration by the Cloud Client to Cloud service(s).

In the illustrated embodiment, there may also Network Connections 214 information stored, which may track networks over which a certain Cloud or Cloud Type may be accessed, or that may express network connection preferences for various Clouds or Cloud Types, such as to minimize costs. It will be appreciated that Network Connections may have associated roaming preferences to limit or preclude connections depending on the current location or connectivity of the Cloud Client, and that in one embodiment associated costs may be recorded as part of the Network Connections data, or in another embodiment as part of Account and Payment information 206.

In the illustrated embodiment there may also be associated Policies 216. These may be systemic policies that may override policies, if any, that might be incorporated into data 202-214, as well as they may be used as the implementation of policies, if any, incorporated into data 202-214. In one embodiment, the Policies may include policies that affect and/or direct the Cloud Client's federation, including whether, and how, to perform multiple layers of federation.

FIG. 3 illustrates a use case, according to one embodiment, in which a Cloud Client 300 wants to connect to different SaaS Cloud 302 services 304, 306. In this embodiment, the Cloud Client 300 contacts an Cloud Federator 308 located on the Internet 310. It will be appreciated that the network being the Internet is for exemplary purposes only and that any other public or private network (or combination thereof) is contemplated. It will further be appreciated that the Cloud Client could be using as well IaaS 312 and/or PaaS 314 services.

In the illustrated embodiment, the Cloud Client 300 seeks similar functions or services from the two different Cloud service providers 304, 306 in the SaaS Cloud 302, such as the Google File Service (GFS) or database (DB) services. As illustrated, the Cloud Client 300 subscribes to an Cloud Federator 308 that operates similarly as discussed above with respect to FIG. 1 in conjunction with FIG. 2 type data 200 with which the Internet based Cloud Federator 308 may interact. By accessing the Internet Cloud Federator, the Cloud Client will be able to obtain federation in terms of consistent features as discussed above with respect to FIG. 1, such as a consistent API (Application Programming Interface), application integration, and application management, file system management, network connectivity, in addition to user profile, UI (User Interface), ID/account managements, etc.

In one embodiment, presentation language is one component that may be federated for consistency. It will be appreciated automatic translation techniques exist that allow for translating from one language to another. In one embodiment, technical context of what type of data is being translated is used to hint, e.g., improve, translation. For example, the word "pounds" in a billing context may translate differently than it might in the context of weight.

It will be appreciated various techniques may be employed to obtain consistency between the SaaS Clouds 304, 306. In one embodiment, the Cloud Federator 308 implements a Service Abstraction Layer (SAL) with which the Cloud Client communicates to, as discussed above, provide a standardized interface to which the SaaS Clouds 304, 306 are mapped (as needed) to access their data and/or services. This then allows the Cloud Client to only know a single (or relatively few) interfaces, and so long as the Cloud Client can communicate with the Cloud Federator's SAL, the Cloud Client can reliably access multiple Clouds regardless of their implementation details.

FIG. 4 illustrates a use case, according to one embodiment, in which a Cloud Client 400 wants to connect to different types of Clouds, e.g., SaaS Cloud 402, IaaS Cloud 404, and PaaS Cloud 406.

In this embodiment, Cloud Client 400 subscribes to an Cloud Federator 408 located on a Public Access Network (PAN) 410, such as a network that might be present in an airport, train station, or other area providing network services to a large number of devices, Cloud Clients, etc. It will be appreciated the network being a PAN is for exemplary purposes only and any network, including the Internet, is contemplated.

In the illustrated embodiment, the Cloud Client 400 subscribes to a Cloud Federator 408 that operates similarly as discussed above with respect to FIG. 1 Cloud Federator 106 in conjunction with FIG. 2 type of data 200 with which the Cloud Federator may interact. By accessing the Cloud Federator, the Cloud Client, as it accesses services and/or data 412-428 provided by different Clouds 402-406, may obtain transparent federation and consistency of API, file system, application integration and management, network connectivity, user profile, UI, ID/account managements, language, etc.

In one embodiment, by making Clouds consistent through use of the Cloud Federator, an entity (including the Cloud Client 400) can construct an entire product offering by combining the platform, infrastructure and services offered by the SaaS, IaaS, and PaaS Clouds, even if the Clouds utilize different techniques to access their services and/or data. It will be appreciated by one skilled in the art that as discussed with respect to FIG. 2 above, the Cloud Federator 408 may provide multiple layers of federation between the Cloud Client 400 and the various Clouds 402-406 with which it is operating. By applying the principles discussed above with respect to FIGS. 1-4, Cloud Clients obtain a basic agility to switch between Clouds to receive services such as private/public, business/personal, different applications (storage, productivity, security, . . . ), etc.

Figure 5:
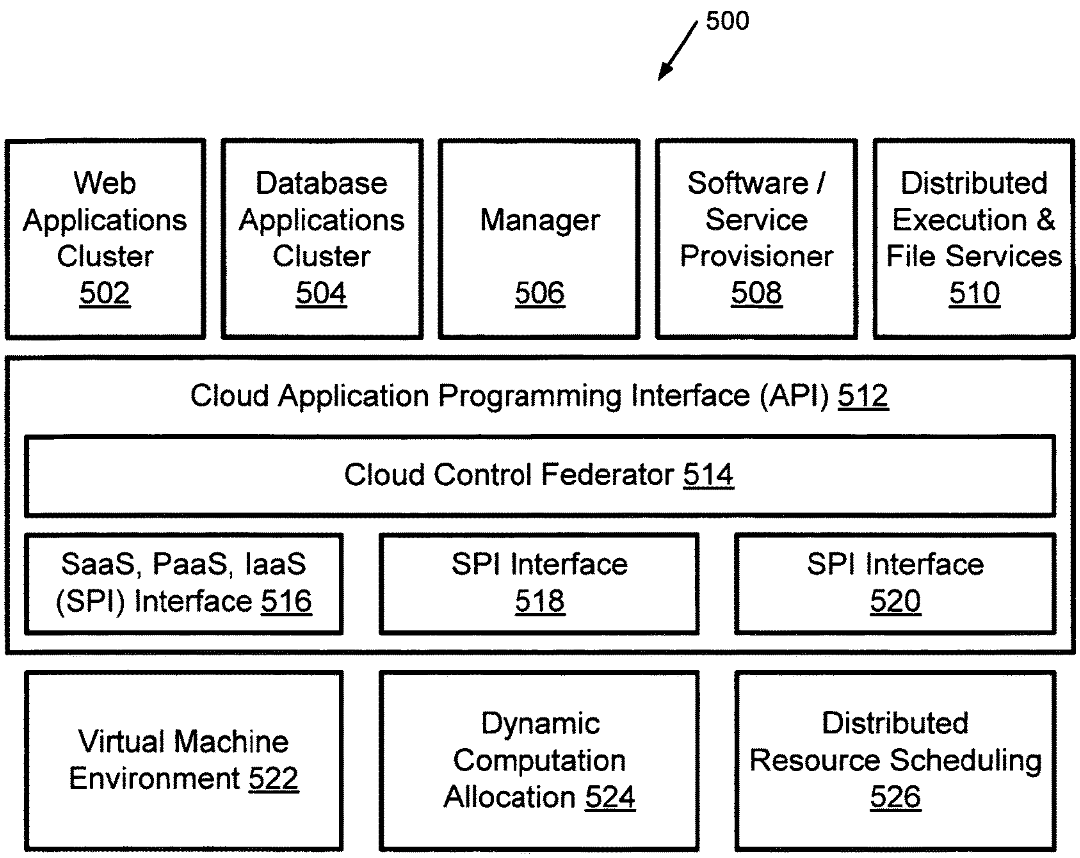
FIG. 5 illustrates, according to one embodiment, a service platform that may provide and support the Cloud Federator illustrated in FIGS. 1, 3, and 4.

FIG. 5 illustrates, according to one embodiment, a service platform 500 that may provide and support the Cloud Federator 106, 308, 408 of FIGS. 1, 3, and 4. It will be appreciated that the illustrated embodiment represents one possible high level abstraction of a management architecture for a platform, such as a server platform. Illustrated are exemplary broadly accessible middleware services 502-510 that can be provided in highly available distributed computing environment (grid, mesh, Cloud, etc.). Illustrated is a Web Applications Cluster 502 which one skilled in the art will appreciate allows serving web based applications to clients, such as a Cloud Client.

Illustrated is a Database Applications Cluster 504 which it will be appreciated may implement any number of database techniques to provide data storage and data access services. Also illustrated is a Manager 506, which in one embodiment, provides system management tools to monitor, manage and automate tasks such as database and applications server management, e.g., for Web Applications Cluster 502 and Database Applications Cluster 504, hardware and software configuration tracking and cloning, manage database configuration and/or schema changes, and dynamic resource allocation to facilitate more efficient task performance. The Manager may manage a variety of different platforms, including Microsoft.NET environments, Microsoft SQL Server, Oracle deployment platforms, NetApp Filers, BEA weblogic, etc. An exemplary Manager that could be used is the Oracle Enterprise Manager.

In the illustrated embodiment, there is also a Software and/or Service Provisioner 508 to allow for automated and on-demand provisioning of software and/or services. It will be appreciated that various techniques may be used, such as through application of a script or workflow concept that may be used to identify and classify tasks to be performed, and have associated operations, steps, data input or output, or the like necessary to accomplish a particular task. The scripts or workflows may of course be dynamically responsive to current operating conditions of a service or software to be provisioned. It will be appreciated use of middleware services 502-508 allows for enforcing consistency in how applications, databases, software, services, etc. may be managed if the middleware is configured to operate in complementary fashion. An exemplary Software/Service Provisioner that may be used is the IBM® Tivoli® Provisioning Manager.

In the illustrated embodiment, shown is a Distributed Execution and File Services 510 component to provide a distributed file system and distributed task execution environment. It will be appreciated by one skilled in the art that selected ones of the middleware services 502-510 may be used with the Distributed Execution and File Services to provide a task execution environment. In combination these services 502-510 represent one exemplary embodiment for exposing a hardware platform to software and middleware to enable federation of services. The illustrated exemplary platform architecture could be used, for example, to provide on-line, subscription-based, real-time services to business clients and consumers for Cloud federation.

In the illustrated embodiment, the services 502-510 are communicatively coupled to a Cloud Application Programming Interface (API) 512. This API allows the services to be designed so as to only have to speak to the API. The API in turn utilizes a Cloud Control Federator 514 that operates to manage and distribute communication with the services 502-510 across multiple SaaS, PaaS and IaaS (SPI) Cloud interfaces 516-520. The SPI interfaces may be configured to provide a front end for desired Cloud services to various requesting Cloud Clients (not illustrated), with the back end hardware environments supporting the service 502-510 may be any combination of Virtual Machine Environment 522, such as an Oracle VMM utilizing the libvirt API, a Dynamic Computation Allocation 524 environment such as the Amazon Elastic Compute Cloud (EC2), or a Distributed Resource Scheduling 526 environment such as the VMware DRS (Distributed Resource Scheduling). By supporting hardware architectures utilizing virtual machine, dynamic computation allocation, in conjunction with a variety of software and service management middleware services 502-510, it will be appreciated that a very efficient and very scalable architecture is presented that may be used, in conjunction with the Cloud Federators discussed above to provide robust federated access to Cloud services. In one embodiment, increased virtual machine security may be implemented in the illustrated shared cloud environment where private data can be accessed only by authorized applications, and activities can be tracked for auditing and compliance reporting.

Based on the foregoing one skilled in the art can appreciate how a Cloud federation service may be implemented to provide real-time "broker" for connections and provide interoperability for a user/Cloud Client, including providing identity federation, so that the Cloud Client can connect to any service without additional user configuration. A federator provides the necessary interoperability, and it should be appreciated by one skilled in the art that identity federation is just one example operation of Cloud Federation, and that the discussion with respect to FIG. 5 should illustrate that many other service, data, events, etc. may be federated. Federation enables simultaneously use of different Clouds along with jumping between clouds without changing profiles or otherwise reconfiguring the Cloud Client. It will be appreciated that a Cloud Client may be dynamically reconfigured as needed, if needed, depending on whether the principles of a SAL (Service Abstraction Layer) have been utilized. It will be further appreciated that with automated federation, there is increased security since there is little room for error, and transparency of operation increases (if applicable) user experience.

FIG. 6 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Machines may be literal physical devices or virtually instantiated machines of various virtual characteristics. Exemplary machines include computing devices such as personal computers, workstations, servers, portable computers, handheld devices, e.g., Personal Digital Assistant (PDA), virtual machines, telephone, tablets, etc., as well as transportation devices, such as private or public transportation, e.g., automobiles, trains, cabs, etc.

Typically, the environment includes a machine 600 that includes a system bus 602 to which is attached one or more processors 604, which may be single or multiple core, as well as dynamically programmable, a memory 606, e.g., random access memory (RAM), read-only memory (ROM), or other state preserving medium, storage devices 608, a video interface 610, and input/output interface ports 612. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 614, 616, 618, such as through a network interface 620, modem 622, or other communicative coupling. Machines may be interconnected by way of a physical and/or logical network 624, such as the networks 108, 310, 410 of FIGS. 1, 3, 4. One skilled in the art will appreciated that communication with network 624 may utilize various wired and/or wireless short range and/or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data such as functions, procedures, data structures, application programs, etc. which when accessed by a machine results in the machine performing tasks or defining abstract data types or low-level hardware contexts. Associated data may be stored in, for example, volatile and/or non-volatile memory 606, or in storage devices 608 and/or associated storage media, including conventional hard-drives, floppy-disks, optical storage, tapes, flash memory, memory sticks, digital video disks, etc., as well as more exotic mediums such as machine-accessible biological state preserving storage. Associated data may be delivered over transmission environments, including network 624, in the form of packets, serial data, parallel data, propagated signals, etc., and may be used in a compressed or encrypted format. Associated data may be used in a distributed environment, and stored locally and/or remotely for access by single or multi-processor machines. Associated data may be used by or in conjunction with embedded controllers; hence in the claims that follow, the term “logic” is intended to refer generally to possible combinations of associated data and/or embedded controllers.

Thus, for example, with respect to the illustrated embodiments, assuming machine 600 embodies the FIG. 4 Cloud Client 400, then remote machines 614, 616 may respectively be the SaaS Cloud 402 and Cloud Federator 408. It will be appreciated that remote machines 614, 616 may be configured like machine 600, and therefore include many or all of the elements discussed for machine 600. Remote Virtual Machine(s) 618 may represent a virtualized representation of machine 600; it will be appreciated the Virtual Machine(s) may be configured so as to increase security, improve performance, or optimize operational characteristics as desired.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as “in one embodiment,” “in another embodiment,” or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. At least one non-transitory computer-readable storage medium storing instructions for execution by at least one computing machine, the at least one computing machine being capable, in operation of the at least one computing machine, of communicating via at least one network with at least one client computer and multiple remote cloud computing service providers, the instructions when executed by the at least one computing machine resulting in the at least one computing machine being capable of performing operations comprising:

receiving, at least in part, via at least one interface associated with the at least one client computer, respective data associated with respective requests to permit at least one cloud-based subscription service of at least one of the multiple remote cloud computing service providers and at least one other cloud-based subscription service of at least one other of the multiple remote cloud computing service providers to be accessed by the at least one client computer, the respective data to be in at least one format that is compatible with the at least one interface;

modifying, at least in part, the at least one format of the respective data so to provide the respective data in other respective formats that are compatible with other respective interfaces associated with the at least one and the at least one other of the multiple remote cloud computing service providers;

providing, at least in part, via the other respective interfaces, the respective data in the other respective formats to the at least one and the at least one other of the multiple remote cloud computing service providers; and providing, at least in part, to the multiple remote cloud computing service providers, portions of profile information associated with the at least one client computer, the portions of the profile information being to facilitate authentication and/or authorization of the at least one client computer to access the multiple remote cloud computing service providers, the authentication and/or authorization being associated, at least in part, with a single sign-on;

wherein:

the at least one interface and the other respective interfaces are mutually different from each other, at least in part;

the at least one format and the other respective formats are mutually different from each other, at least in part;

the at least one client computer, the at least one of the multiple remote cloud computing service providers, and the at least one other of the multiple remote cloud computing service providers use respective techniques for service access, data transport, and the authentication that are mutually incompatible with each other;

the operations also comprise automatically dynamically modifying, by the at least one computing machine, received data for compatibility with the respective techniques so as to permit the service access, the authentication, and the data transport; and the at least one cloud-based subscription service and/or the at least one other cloud-based subscription service are to be implemented using a virtual machine environment.

2. The at least one non-transitory computer-readable storage medium of claim 1, wherein:

the at least one interface comprises a standardized interface; and when the at least one computing machine is in the operation, the at least one computing machine is capable of permitting the at least one client computer to transparently access cloud-based subscription services of the multiple remote cloud computing service providers via the at least one computing machine.

3. The at least one non-transitory computer-readable storage medium of claim 2, wherein:

when the at least one computing machine is in the operation, the at least one computing machine is capable of receiving from the at least one client computer identification of types of the cloud-based subscription services to which subscription is to be sought.

4. The at least one non-transitory computer-readable storage medium of claim 3, wherein:

when the at least one computing machine is in the operation, the at least one computing machine is capable of receiving from the at least one client computer identities of the multiple remote cloud computing service providers and/or the cloud-based subscription services to which the subscription is to be sought.

5. The at least one non-transitory computer-readable storage medium of claim 4, wherein:

the at least one interface comprises an application programming interface; and when the at least one computing machine is in the operation, the at least one computing machine is to provide connection and interoperability brokerage service between the at least one client computer and the multiple remote cloud computing service providers.

6. The at least one non-transitory computer-readable storage medium of claim 5, wherein:

the at least one computing machine is to communicate with the multiple computing service providers via associated interfaces; and the at least one computing machine is to modify, at least in part, portions of data received via the associated interfaces for compatibility with the at least one interface for presentation to the at least one client computer.

7. At least one computing machine that is capable, when the at least one computing machine is in operation, of communicating via at least one network with at least one client computer and multiple remote cloud computing service providers, the at least one computing machine comprising:

at least one processor; and storage to store program instructions to be executed, at least in part, by the at least one processor, the program instructions when executed, at least in part, by the at least one processor resulting in the at least one computing machine being capable of performing operations comprising:

receiving, at least in part, via at least one interface of the at least one computing machine that is associated with the at least one client computer, respective data associated with respective requests to permit at least one cloud-based subscription service of at least one of the multiple remote cloud computing service providers and at least one other cloud-based subscription service of at least one other of the multiple remote cloud computing service providers to be accessed by the at least one client computer, the respective data to be in at least one format that is compatible with the at least one interface;

modifying, at least in part, the at least one format of the respective data so to provide the respective data in other respective formats that are compatible with other respective interfaces of the at least one computing machine that are associated with the at least one and the at least one other of the multiple remote cloud computing service providers;

providing, at least in part, via the other respective interfaces, the respective data in the one other respective formats to the at least one and the at least one other of the multiple remote cloud computing service providers; and providing, at least in part, to the multiple remote cloud computing service providers, portions of profile information associated with the at least one client computer, the portions of the profile information being to facilitate authentication and/or authorization of the at least one client computer to access the multiple remote cloud computing service providers, the authentication and/or authorization being associated, at least in part, with a single sign-on;

wherein:

the at least one interface and the other respective interfaces are mutually different from each other, at least in part;

the at least one format and the other respective formats are mutually different from each other, at least in part;

the at least one client computer, the at least one of the multiple remote cloud computing service providers, and the at least one other of the multiple remote cloud computing service providers use respective techniques for service access, data transport, and the authentication that are mutually incompatible with each other;

the operations also comprise automatically dynamically modifying, by the at least one computing machine, received data for compatibility with the respective techniques so as to permit the service access, the authentication, and the data transport; and the at least one cloud-based subscription service and/or the at least one other cloud-based subscription service are to be implemented using a virtual machine environment.

8. The at least one computing machine of claim 7, wherein:

the at least one interface comprises a standardized interface; and when the at least one computing machine is in the operation, the at least one computing machine is capable of permitting the at least one client computer to transparently access cloud-based subscription services of the multiple remote cloud computing service providers via the at least one computing machine.

9. The at least one computing machine of claim 8, wherein:

when the at least one computing machine is in the operation, the at least one computing machine is capable of receiving from the at least one client computer identification of types of the cloud-based subscription services to which subscription is to be sought.

10. The at least one computing machine of claim 9, wherein:

when the at least one computing machine is in the operation, the at least one computing machine is capable of receiving from the at least one client computer identities of the multiple remote cloud computing service providers and/or the cloud-based subscription services to which the subscription is to be sought.

11. The at least one computing machine of claim 10, wherein:

the at least one interface comprises an application interface; and when the at least one computing machine is in the operation, the at least one computing machine is to provide connection and interoperability brokerage service between the at least one client computer and the multiple remote cloud computing service providers.

12. The at least one computing machine of claim 11, wherein:

the at least one computing machine is to communicate with the multiple computing service providers via associated interfaces; and the at least one computing machine is to modify, at least in part, portions of data received via the associated interfaces for compatibility with the at least one interface for presentation to the at least one client computer.

13. At least one client computer that is capable, when the at least one client computer is in operation, of communicating via at least one network at least one computing machine, the at least one computing machine being communicate with the multiple remote cloud computing service providers via the at least one network, the at least one client computer comprising:

at least one processor; and storage to store program instructions to be executed, at least in part, by the at least one processor, the program instructions when executed, at least in part, by the at least one processor resulting in the at least one client computer being capable of performing operations comprising:

generating, at least in part, respective data associated with respective requests to permit at least one cloud-based subscription service of at least one of the multiple remote cloud computing service providers and at least one other cloud-based subscription service of at least one other of the multiple remote cloud computing service providers to be accessed by the at least one client computer, the respective data to be received via at least one interface of the at least one computing machine that is associated with the at least one client computer, the respective data to be in at least one format that is compatible with the at least one interface, the at least one format of the respective data to be modified, at least in part, by the at least one computing machine so to provide the respective data in other respective formats that are compatible with other respective interfaces of the at least one computing machine that are associated with the at least one and the at least one other of the multiple remote cloud computing service providers, the respective data in the other respective formats to be provided, at least in part, to the at least one and the at least one other of the multiple remote cloud computing service providers;

wherein:

authentication and/or authorization of the at least one client computer to access the multiple remote cloud computing service providers is to facilitated by provision, at least in part, by the at least one computing machine to the multiple remote cloud computing service providers, of portions of profile information associated with the at least one client computer, the authentication and/or authorization being associated, at least in part, with a single sign-on;

the at least one interface and the other respective interfaces are mutually different from each other, at least in part;

the at least one format and the other respective formats are mutually different from each other, at least in part;

the at least one client computer, the at least one of the multiple remote cloud computing service providers, and the at least one other of the multiple remote cloud computing service providers use respective techniques for service access, data transport, and the authentication that are mutually incompatible with each other;

the at least one computing machine is to automatically dynamically modify received data for compatibility with the respective techniques so as to permit the service access, the authentication, and the data transport; and the at least one cloud-based subscription service and/or the at least one other cloud-based subscription service are to be implemented using a virtual machine environment.

14. The at least one client computer of claim 13, wherein:

the at least one interface comprises a standardized interface; and when the at least one client computer is in the operation, the at least one client computer is to transparently access cloud-based subscription services of the multiple remote cloud computing service providers via the at least one computing machine.

15. The at least one client computer of claim 14, wherein:

when the at least one client computer is in the operation, the at least one client computer is to generate, for provision to the at least one computing machine, identification of types of the cloud-based subscription services to which subscription is to be sought.

16. The at least one client computer of claim 15, wherein:

when the at least one client computer is in the operation, the at least one client computer is to generate, for provision to the at least one computing machine, identities of the multiple remote cloud computing service providers and/or the cloud-based subscription services to which the subscription is to be sought.

17. The at least one client computer of claim 16, wherein:

the at least one interface comprises an application programming interface; and when the at least one client computer is in the operation, the at least one client computer is to receive, via the at least one computing machine, connection and interoperability brokerage service between the at least one client computer and the multiple remote cloud computing service providers.

18. The at least one client computer of claim 17, wherein:

the at least one computing machine is to communicate with the multiple computing service providers via associated interfaces; and the at least one client computer is to be receive portions of data received by the at least one computing machine via the associated interfaces that have been modified, at least in part, by the at least one computing machine for compatibility with the at least one interface for presentation to the at least one client computer.

19. One or more non-transitory computer-readable storage media storing instructions for execution by one or more computing machines, the one or more computing machines being capable, in operation of the one or more computing machines, of communicating via one or more networks with one or more client computers and multiple remote cloud computing service providers, the instructions when executed by the one or more computing machines resulting in the one or more computing machines being capable of performing operations comprising:

receiving via one or more interfaces associated with the one or more client computers, respective data associated with respective requests to permit one or more cloud-based subscription services of one or more of the multiple remote cloud computing service providers and one or more other of the multiple remote cloud computing service providers to be accessed by the one or more client computers, the respective data to be in one or more formats that are compatible with the one or more interfaces;

modifying the one or more formats of the respective data so to provide the respective data in other respective formats that are compatible with other respective interfaces associated with the one or more and the one or more other of the multiple remote cloud computing service providers;

providing via the other respective interfaces, the respective data in the other respective formats to the one or more and the one or more other of the multiple remote cloud computing service providers; and providing to the multiple remote cloud computing service providers, portions of profile information associated with the one or more client computers, the portions of the profile information being to facilitate authentication and/or authorization of the one or more client computers to access the multiple remote cloud computing service providers, the authentication and/or authorization being associated with a single sign-on;

wherein:

the one or more interfaces and the other respective interfaces are mutually different from each other, at least in part;

the one or more formats and the other respective formats are mutually different from each other, at least in part;

the one or more client computers, the one or more of the multiple remote cloud computing service providers, and the one or more other of the multiple remote cloud computing service providers use respective techniques for service access, data transport, and the authentication that are mutually incompatible with each other;

the operations also comprise automatically dynamically modifying, by the one or more computing machines, received data for compatibility with the respective techniques so as to permit the service access, the authentication, and the data transport; and the one or more cloud-based subscription services and/or the one or more other cloud-based subscription services are to be implemented using a virtual machine environment.

20. The one or more non-transitory computer-readable storage media of claim 19, wherein:

the one or more interfaces comprise a standardized interface; and when the one or more computing machines are in the operation, the one or more computing machines are capable of permitting the one or more client computers to transparently access cloud-based subscription services of the multiple remote cloud computing service providers via the one or more computing machines.

21. The one or more non-transitory computer-readable storage media of claim 20, wherein:

when the one or more computing machines are in the operation, the one or more computing machines are capable of receiving from the one or more client computers identification of types of the cloud-based subscription services to which subscription is to be sought.

22. The one or more non-transitory computer-readable storage media of claim 21, wherein:

when the one or more computing machines are in the operation, the one or more computing machines are capable of receiving from the one or more client computers identities of the multiple remote cloud computing service providers and/or the cloud-based subscription services to which the subscription is to be sought.

23. The one or more non-transitory computer-readable storage media of claim 22, wherein:

the one or more interfaces comprise an application programming interface; and when the one or more computing machines are in the operation, the one or more computing machines are to provide connection and interoperability brokerage service between the one or more client computers and the multiple remote cloud computing service providers.

24. The one or more non-transitory computer-readable storage media of claim 23, wherein:

the one or more computing machines are to communicate with the multiple computing service providers via associated interfaces; and the one or more computing machines are to modify, at least in part, portions of data received via the associated interfaces for compatibility with the one or more interfaces for presentation to the one or more client computers.

* * * * *